United States Patent [19]

Bertram et al.

[11] 4,408,062

[45] Oct. 4, 1983

[54] PROCESS FOR PREPARING LOW MOLECULAR WEIGHT EPOXY RESINS

[75] Inventors: James L. Bertram; George E. Ham; Wuu-Nan Chen, all of Lake Jackson, Tex.

[73] Assignee: The Dow Chemical Company, Midland, Mich.

[21] Appl. No.: 359,463

[22] Filed: Mar. 18, 1982

[51] Int. Cl.$^3$ .......................................... C07D 301/28
[52] U.S. Cl. ........................................................ 549/517
[58] Field of Search .......................................... 549/517

[56] References Cited

U.S. PATENT DOCUMENTS

| | | | |
|---|---|---|---|
| 2,801,227 | 7/1957 | Goppel | 260/46 |
| 2,840,541 | 6/1958 | Pezzaglia | 260/47 |
| 2,841,595 | 7/1958 | Pezzaglia | 260/348.6 |
| 2,848,435 | 8/1958 | Griffin et al. | 260/47 |
| 2,986,551 | 5/1961 | Griffin et al. | 260/47 |
| 2,986,552 | 5/1961 | Landua et al. | 260/47 |
| 3,071,560 | 1/1963 | Fetscher et al. | 549/517 |
| 3,094,506 | 6/1963 | Weinberg et al. | 549/517 |
| 3,121,727 | 2/1964 | Baliker et al. | 260/348.6 |

FOREIGN PATENT DOCUMENTS

| | | | |
|---|---|---|---|
| 564628 | 10/1958 | Canada | 549/517 |
| 897744 | 5/1962 | United Kingdom . | |
| 1063540 | 11/1965 | United Kingdom | 549/517 |
| 1084332 | 9/1967 | United Kingdom | 549/517 |

*Primary Examiner*—Norma S. Milestone
*Attorney, Agent, or Firm*—J. G. Carter

[57] ABSTRACT

The epihalohydrin yield in a process for preparing low molecular weight epoxy resins by coupling a polyhydric phenol and an epihalohydrin in the presence of an alkali metal hydroxide and subsequent dehydrohalogenation is improved by employing stoichiometric quantities of the alkali metal hydroxide with respect to the polyhydric phenol in the coupling reaction and also conducting the coupling reaction in the presence of a halohydrin that is at least as reactive as the halohydrin being formed.

4 Claims, No Drawings

PROCESS FOR PREPARING LOW MOLECULAR WEIGHT EPOXY RESINS

BACKGROUND OF THE INVENTION

The present invention concerns a process for preparing low molecular weight epoxy resins by reacting an excess of an epihalohydrin with a polyhydric phenol in the presence of a stoichiometric quantity of an alkali metal hydroxide and a halohydrin that is at least as reactive with the alkali metal hydroxide as the halohydrin produced in the reaction and subsequently dehydrohalogenating the resultant product.

In the prior art processes, the reaction to make the bis chlorohydrin has been performed by adding small amounts of sodium hydroxide in increments to a reaction mixture of excess epihalohydrin and bisphenol and when the sodium hydroxide was no longer present or the rate of the reaction became very slow, a further increment of sodium hydroxide would be added. Performing the reaction in this manner, a number of different steps of caustic additions were necessary. The reason for adding small amounts of caustic in this manner is that the sodium hydroxide catalyzes the hydrolysis of epichlorohydrin to glycerine monochlorohydrin.

In order to reduce the rate of the side reaction leading to glycerine monochlorohydrin, which eventually is hydrolyzed to glycidol and glycerine, the prior art has attempted to add the sodium hydroxide in small increments so that the by-product formation from the epichlorohydrin is minimized.

By adding a more reactive chlorohydrin than that which is formed from the reaction if bisphenol A and epichlorohydrin to the reaction mixture at the beginning, it is possible according to the instant invention to add all of the sodium hydroxide at the beginning of the reaction without a consequent loss of epichlorohydrin due to the above side reaction.

One major disadvantage of the prior art processes employing sodium hydroxide as the catalyst is that sequential addition of sodium hydroxide requires either a batch reaction be performed or a series of batch reactions in a continuous manner be performed. By adding all of the sodium hydroxide at the beginning of the reaction, it is possible with the instant invention to feed the mixture simply to a continuous reactor for a single pass through the reactor and achieve high conversions with high yield based on epichlorohydrin.

SUMMARY OF THE INVENTION

The present invention pertains to an improvement in a process for preparing low molecular weight epoxy resins by (1) reacting at least one epihalohydrin with at least one polyhydric phenol in the presence of at least one alkali metal hydroxide thereby forming a halohydrin-containing intermediate product and (2) subsequently dehydrohalogenating said intermediate product; wherein the improvement comprises (a) employing said alkali metal hydroxide in stoichiometric quantities with said polyhydric phenol, (b) adding the total amount of alkali metal hydroxide at the beginning; and conducting the eiphalohydrin-polyhydric phenol reaction in the presence of an additional halohydrin other than that which is formed in the reaction which additional halohydrin has a reaction rate constant with respect to said alkali metal hydroxide at least as high as, preferably higher than, that of the halohydrin intermediate product and which has been added in a quantity sufficient to increase the yield based on the eiphalohydrin.

DETAILED DESCRIPTION OF THE INVENTION

Suitable polyhydric phenols which can be employed herein include any material having an average of more than one phenolic hydroxyl group per molecule. Such materials can contain one or a plurality of aromatic rings. Suitable such materials include, for example, resorcinol, catechol, hydroquinone, bisphenols, phenol-aldehyde novolac resins, mixtures thereof and the like. Also suitable are the halogenated and/or alkylated derivatives thereof.

Suitable epihalohydrins which can be employed herein include, for exaple, epichlorohydrin, epibromohydrin, epiiodohydrin, methylepichlorohydrin, methylepibromohydrin, methylepiiodohydrin, mixtures thereof and the like.

Suitable alkali metal hydroxides which can be employed herein include, for example, sodium hydroxide, potassium hydroxide, lithium hydroxide, mixtures thereof and the like.

Suitable halohydrins which can be employed herein will vary with the particular reactants and reaction conditions employed. Likewise, the suitable and optimum quantities will depend upon the particular components and reaction conditions employed. The more reactive halohydrins will require less quantities than the less reactive halohydrins to achieve similar results. At any rate, the halohydrin added must be at least as reactive and preferably more reactive towards the alkali metal hydroxide employed than the halohydrin formed by the reaction of the polyhydric phenol and epihalohydrin.

The reaction rates of the halohydrin intermediate formed in the reaction as well as that of the halohydrin to be added can be determined by any standard kinetic method commonly used to measure reaction rates. A simple method is to mix the halohydrin with an equimolar amount of caustic at some standard concentration, e.g. one molar, and measure the amount of ionic chloride formed after a set time period.

Suitable such halohydrins which can be added include, for example, 1,2-glycerinedihalohydrin, 1,3-glycerinedihalohydrin, ethylene halohydrin, 1-hydroxy-2-chloropropane, 1-chloro-2-hydroxy-3-phenoxy propane, the mono- and di-3-chloro-2-hydroxypropoxy ethers of bisphenol A, mixtures thereof and the like.

The reaction employing the alkali metal hydroxide, polyhydric phenol, epihalohydrin and added halohydrin can be carried out neat or in the presence of an organic diluent such as alcohols, ketones, low molecular weight aliphatic nitriles, ethylene glycol ethers, mixtures thereof and the like.

The reaction between the epihalohydrin, polyhydric phenol, alkali metal hydroxide and added halohydrin can be carried out at temperatures of from about 0° C. to about 120° C., preferably from about 20° C. to about 100° C. The reaction time varies, of course as with most all chemical reactions, with the temperature and concentration of the reactants. However, in the present invention, the reaction is sustained until at least about 95, preferably at least about 98, percent by weight of the polyhydric phenol has been consumed. This can be monitored by measuring the amount of unreacted aromatic hydroxyl group present by any method specific for such groups. One such method involves treatment of the reaction sample with excess methanolic NaOH, measuring the ultraviolet light absorbance of the sample at 310 nanometers and comparing the value with that obtained from a calibration curve.

The dehydrohalogenation can be conducted by any manner known in the art which usually involves contacting the intermediate product with a base acting material and then removing the salt formed in the reaction. Suitable base acting materials include, for example, alkali and alkali earth metal hydroxides, mixtures thereof and the like.

The following examples are for illustrative purposes only and are not to be construed as to limiting the scope thereof in any manner.

EXAMPLE 1

Into a 500 ml 3-neck flask was weighed 22.8 grams (0.100 mole) of para bisphenol A, 8.0 grams (0.200 mole) of sodium hydroxide and 208 grams (11.56 moles) of water. The mixture was agitated under a nitrogen purge until complete solution had occurred. Into this mixture was charged a solution of varying amounts of 1,3-dichloro-2-propanol in 185 grams (2 moles) of epichlorohydrin. The mixture was then agitated for exactly one hour (3600 s) at a controlled temperature of 30° C. After this time, samples were withdrawn for analysis. The amount of bisphenol A which had been converted (phenolic OH conversion) was determined by ultraviolet spectrophotometer. The amount of diglycidyl ether and glycidol which had been formed in the reaction was determined by gas chromatography analysis. The amount of glycerine which had been formed in the reaction was determined by liquid chromatography analysis. The yield of product based on the amount of epichlorohydrin converted was determined from the phenolic OH conversion and the amounts of the above by-products which were formed from the epichlorohydrin. Ths is reported as the % yield based on epichlorohydrin. The results of these experiments are shown in the following Table.

|  | Experiment No. | | | |
| --- | --- | --- | --- | --- |
|  | 1* | 2 | 3 | 4 |
| Grams/moles of Added 1,3-Dichloro-2-Propanol | 0/0 | 5/0.04 | 10/0.08 | 15/0.12 |
| % Yield Based on Converted Epichlorohydrin | 80.3 | 88.5 | 90.7 | 94.4 |

*= comparative experiment

In the above experiments, the reaction mixture was two-phased throughout the reaction and the reaction was carried to approximately 70% conversion of the phenolic hydroxyl groups at the end of 1 hour (3600 s). In the following example, the reaction mixture was homogenous throughout the reaction and the reaction was conducted until 95% conversion of the phenolic hydroxyl group was achieved.

EXAMPLE 2

The reaction between epichlorohydrin and bisphenol A was carried out exactly as described in example 1 above except that the following reagents and quantity of reagents were used: 11.4 grams (0.05 mole) of bisphenol A; 4.0 grams (0.1 mole) of sodium hydroxide; 104 grams (5.78 moles) of water; 93.0 grams (1 mole) of epichlorohydrin; 176.0 grams (1.96 moles) of the monomethyl ether of propylene glycol; and either 0 (0 mole) or 4 grams (0.03 mole) of 1,3-dichloro-2-propanol.

From the experiment containing no added 1,3-dichloro-2-propanol, the reaction was stopped after 214 minutes (12840 s) and the conversion of phenolic hydroxyl group was 99.2%. This reaction showed a yield based on epichlorohydrin of 89.9%.

In the experiment containing 4 grams (0.03 mole) of 1,3-dichloro-2-propanol, the reaction was stopped after 280 minutes (16800 ); the conversion was 95.3%; the yield based on converted epichlorohydrin was 95.7%.

We claim:

1. In a process for preparing low molecular weight epoxy resins by (1) reacting at least one epihalohydrin with at least one polyhydric phenol in the presence of at least one alkali metal hydroxide thereby forming a halohydrin-containing intermediate product and (2) subsequently dehydrohalogenating said intermediate product; the improvement which comprises
(a) employing said alkali metal hydroxide in a quantity which is stoichiometric with the quantity of polyhydric phenol employed;
(b) adding the total amount of alkali metal hydroxide at the beginning; and
(c) conducting the epihalohydrin-polyhydric phenol reaction in the presence of an additional halohydrin other than that which is formed in the reaction and which has a reaction rate constant with respect to said alkali metal hydroxide at least as high as that of the halohydrin intermediate product and which additional halohydrin has been added in a quantity which is sufficient to increase the yield based on said epihalohydrin.

2. A process of claim 1 wherein said polyhydric phenol is bisphenol A, said epihalohydrin is epichlorohydrin, said alkali metal hydroxide is sodium hydroxide and said additional halohydrin is 1,3-dichloro-2-propanol.

3. A process of claims 1 or 2 wherein the reaction (1) is conducted in the presence of an inert organic reaction medium.

4. A process of claim 3 wherein said inert reaction medium is an alcohol, ketone or mixture thereof.

* * * * *